(12) United States Patent
Okuyama et al.

(10) Patent No.: US 7,969,643 B2
(45) Date of Patent: Jun. 28, 2011

(54) DISPLAY PARTICLES FOR IMAGE DISPLAY APPARATUS AND IMAGE DISPLAY APPARATUS LOADED WITH THE SAME

(75) Inventors: Okushi Okuyama, Tokyo (JP); Yukio Hosoya, Tokyo (JP); Satoshi Uchino, Tokyo (JP); Hiroyuki Konno, Tokyo (JP); Kouji Shibata, Tokyo (JP); Mikio Kouyama, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 12/817,268

(22) Filed: Jun. 17, 2010

(65) Prior Publication Data

US 2010/0321763 A1  Dec. 23, 2010

(30) Foreign Application Priority Data

Jun. 23, 2009 (JP) ................................. 2009-148494

(51) Int. Cl.
*G02B 26/00* (2006.01)
*G09G 3/34* (2006.01)

(52) U.S. Cl. ........................................ 359/296; 345/107

(58) Field of Classification Search .................. 359/296; 345/107; 430/32; 204/600
See application file for complete search history.

(56) References Cited

U.S. PATENT DOCUMENTS 7,529,019 B2 * 5/2009 Baesjou et al. ............... 359/296

* cited by examiner

*Primary Examiner* — William C Choi
(74) *Attorney, Agent, or Firm* — Lucas & Mercanti, LLP

(57) ABSTRACT

Display particles for an image display apparatus, wherein the image display apparatus comprises two substrates at least one of which is transparent, with the display particles being sealed between the substrates in a powder state, so that by generating an electric field between the substrates, the display particles are moved to display an image, wherein the display particles are formed through processes in which at least a binder resin and a colorant are kneaded and pulverized to give core particles, resin fine particles are fixed and fused on surfaces of the core particles, and then the core particles on which the resin fine particles are fixed and fused are sphered to give an average degree of roundness of 0.960 or more, and wherein a ratio of use of the resin fine particles is set in the range from 100 to 300% in the rate of the total projection area of the resin fine particles relative to the total surface area of the core particles, as well as an image display apparatus loaded with the display particles.

13 Claims, 5 Drawing Sheets

Fig. 2
(a) Before voltage application
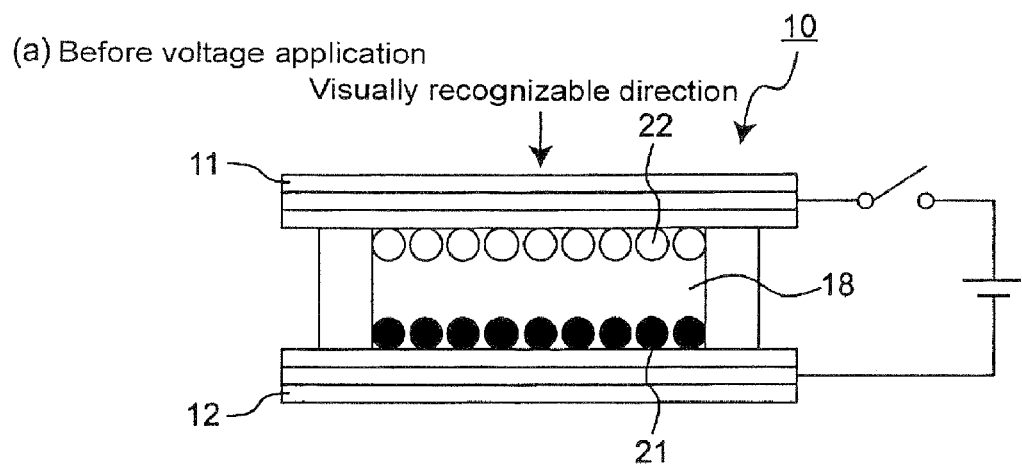
(b) After voltage application
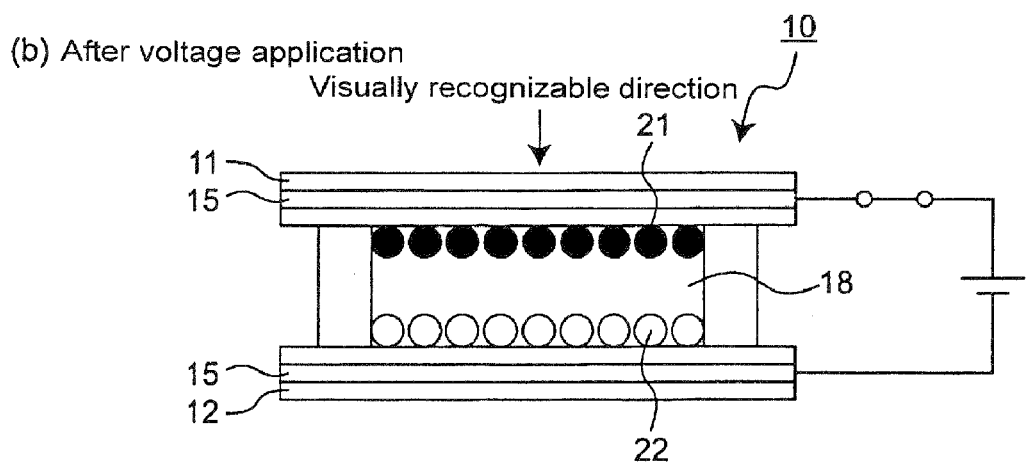

Fig. 3
(a) Before voltage application (Switch OFF)
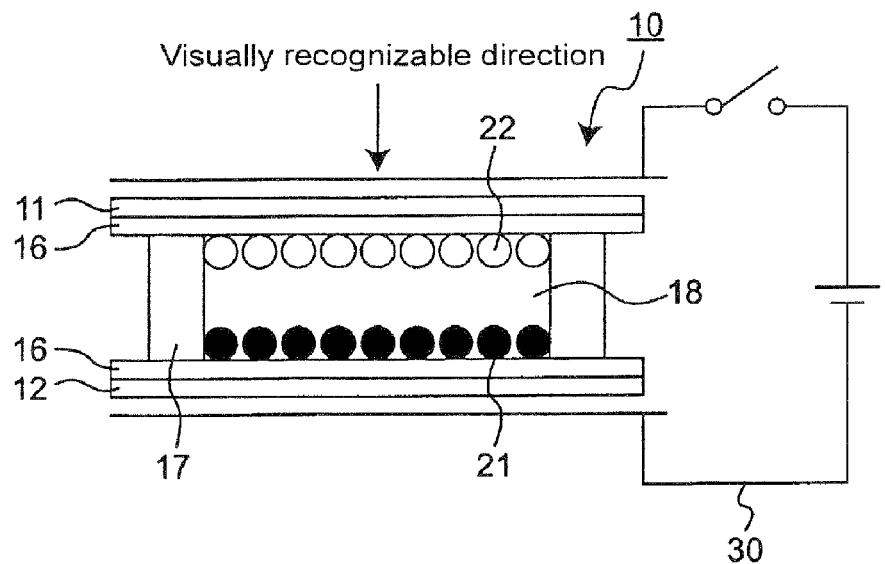
(b) After voltage application (Switch ON)
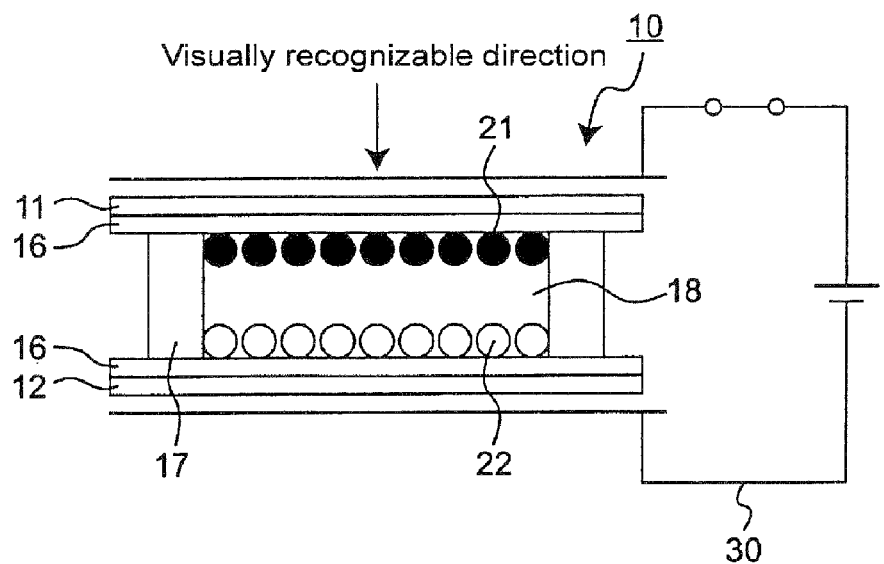

Fig. 4

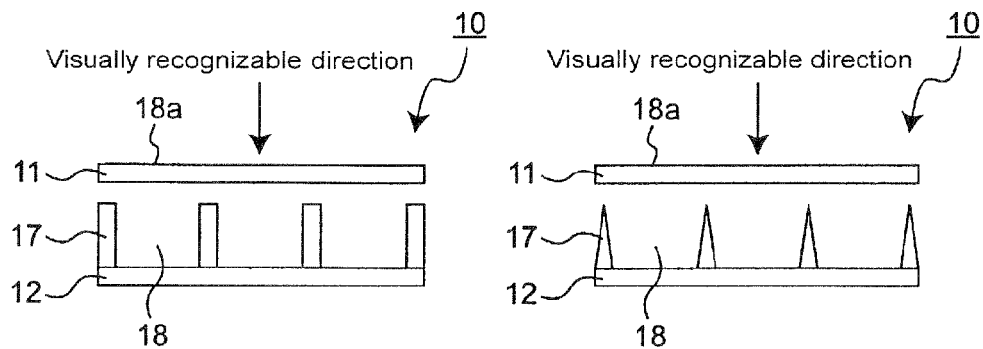

◎ Image display surface
(Base member 11 viewed in visually recognizable direction)

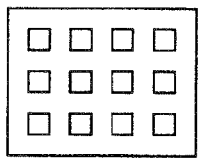
Square cell lattice-shaped configuration

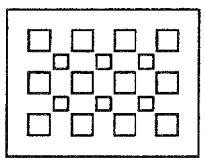
Square cell honeycomb configuration 1

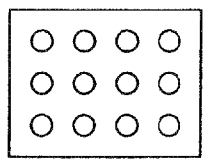
Round cell lattice-shaped configuraion

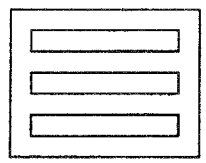
Line-shaped cell

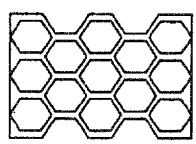
Hexagonal cell honeycomb configuration

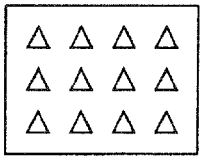
Triangular cell lattice-shaped configuration

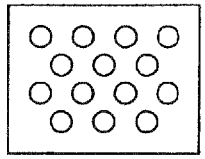
Round cell honeycomb configuration

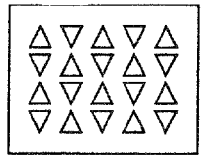
Triangular cell honeycomb configuration

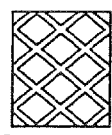
Square cell network configuration

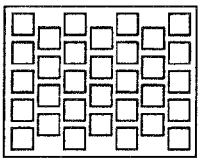
Square cell honeycomb configuration 2

Fig. 5
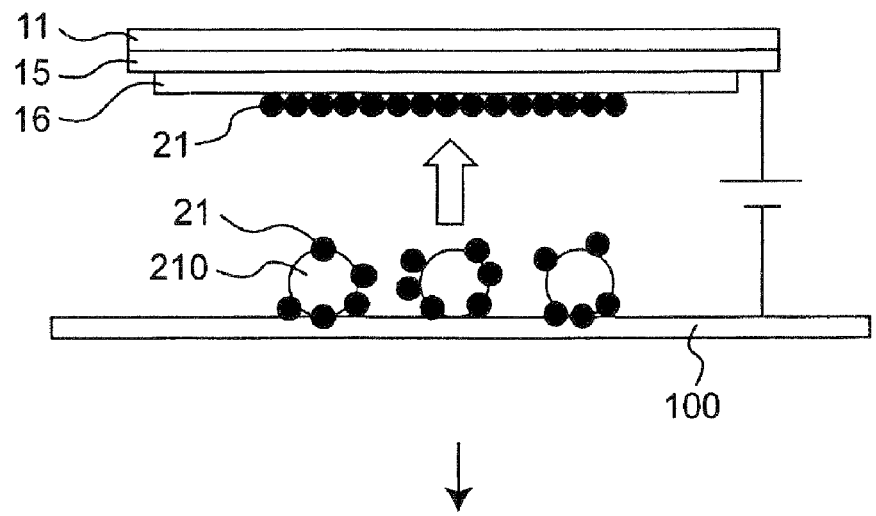
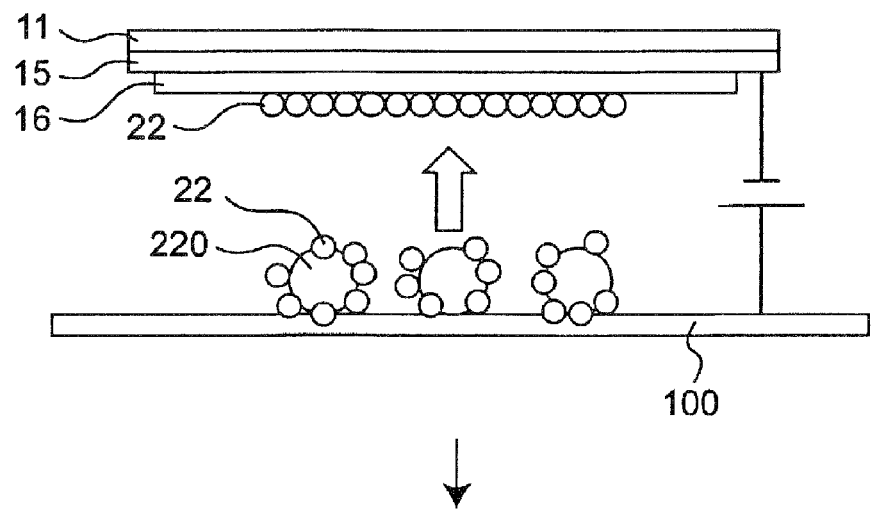
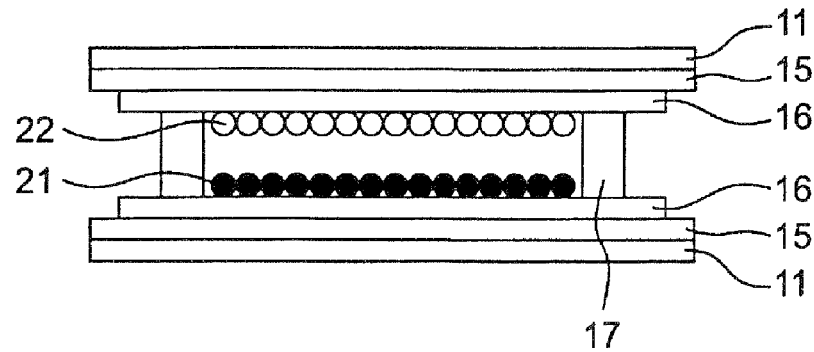

DISPLAY PARTICLES FOR IMAGE DISPLAY APPARATUS AND IMAGE DISPLAY APPARATUS LOADED WITH THE SAME

This application is based on application No. 2009-148494 filed in Japan, the contents of which are hereby incorporated by reference.

BACKGROUND OF THE INVENTION

1. Field of the Invention

The present invention relates to an image display apparatus that can execute displaying and erasing operations of images repeatedly by moving display particles in an electric field and such display particles to be used in the image display apparatus.

2. Description of Related Art

Conventionally, an image display apparatus that displays images by moving display particles in a gaseous phase has been known. The image display apparatus has a structure in which display particles in a powder state are sealed between two substrates at least one of which is transparent, and by generating an electric field between the substrates, the display particles are moved and adhered to one of the substrates so that an image is displayed. Upon driving such an image display apparatus, a voltage is applied between the substrates to generate an electric field, and the display particles are moved along the electric field direction so that by selecting the electric field direction on demand, the displaying and erasing operations of images can be executed repeatedly. However, once the display particles have been adhered to the substrate, the display particles become unmovable in the adhered state to the substrate since the display particles have a comparatively high adhesive force, resulting in problems that the driving voltage needs to be increased and that the contrast between an image portion and a non-image portion deteriorates. In order to reduce the driving voltage and improve the contrast, each of the display particles needs to maintain appropriate charge thereon.

As a method for producing display particles for an image display apparatus, a pulverizing method has been known in which, after a resin and a colorant have been mixed and kneaded into pellets, the pellets are pulverized and classified so as to obtain particles having a target particle size. Moreover, it has been known that the pulverizing method makes it possible to fill a comparatively large amount of colorants. However, in the display particles obtained through the pulverizing method, the colorant tends to be exposed to the particle surface to make it difficult to maintain electric charge, resulting in degradation of the contrast between an image portion and a non-image portion from the initial driving stage. In a case where, in order to improve the contrast, the content of the colorant is set to a comparatively high level, the exposure of the colorant onto the particle surface becomes conspicuous to cause further degradation of the contrast. Moreover, since the particles obtained by the pulverizing method have a low degree of roundness to cause high physical adhesive force between the substrate and the particles, a higher driving voltage is required.

In particular, the white colorant is poor in its tinting property, with the result that the white display particles, obtained by using the white colorant, tend to fail to provide a sufficient degree of whiteness. Consequently, in a case where white display particles are formed by the pulverizing method using a comparatively large amount of the white colorant, the exposure of the colorant becomes conspicuous correspondingly, with the result that the initial contrast is lowered and the degradation of the contrast becomes further conspicuous on driving repeatedly.

It is an object of the present invention to provide display particles for an image display apparatus as well as such an image display apparatus that can reduce a driving voltage, and repeatedly display images having sufficiently superior contrast between an image portion and a non-image portion for a long period of time.

SUMMARY OF THE INVENTION

The present invention relates to display particles for an image display apparatus that includes two substrates at least one of which is transparent, with the display particles being sealed between the substrates in a powder state, so that by generating an electric field between the substrates, the display particles are moved to display an image, wherein the display particles are formed by fixing and fusing resin fine particles on surfaces of core particles formed by processes where at least a binder resin and a colorant are kneaded and pulverized, and then sphering the resulting particles into a spherical shape having an average degree of roundness of 0.960 or more, and the ratio of use of the resin fine particles is set in the range from 100 to 300% in the rate of the total projection area of the resin fine particles relative to the total surface area of the core particles, and also an image display apparatus provided with the display particles.

BRIEF DESCRIPTION OF THE DRAWINGS

FIGS. 2(a)-(b) are schematic drawings that show one example of movements of display particles due to a voltage application between substrates.

FIGS. 3(a)-(b) are schematic drawings that show another example of movements of display particles due to a voltage application between the substrates.

FIG. 4 is a schematic drawing that shows examples of a shape of an image display surface.

FIGS. 5(a)-(c) are schematic drawings that show an example of a sealing method for display particles.

DETAILED DESCRIPTION OF THE INVENTION

Display Particles for Image Display Apparatus

Figure 1:
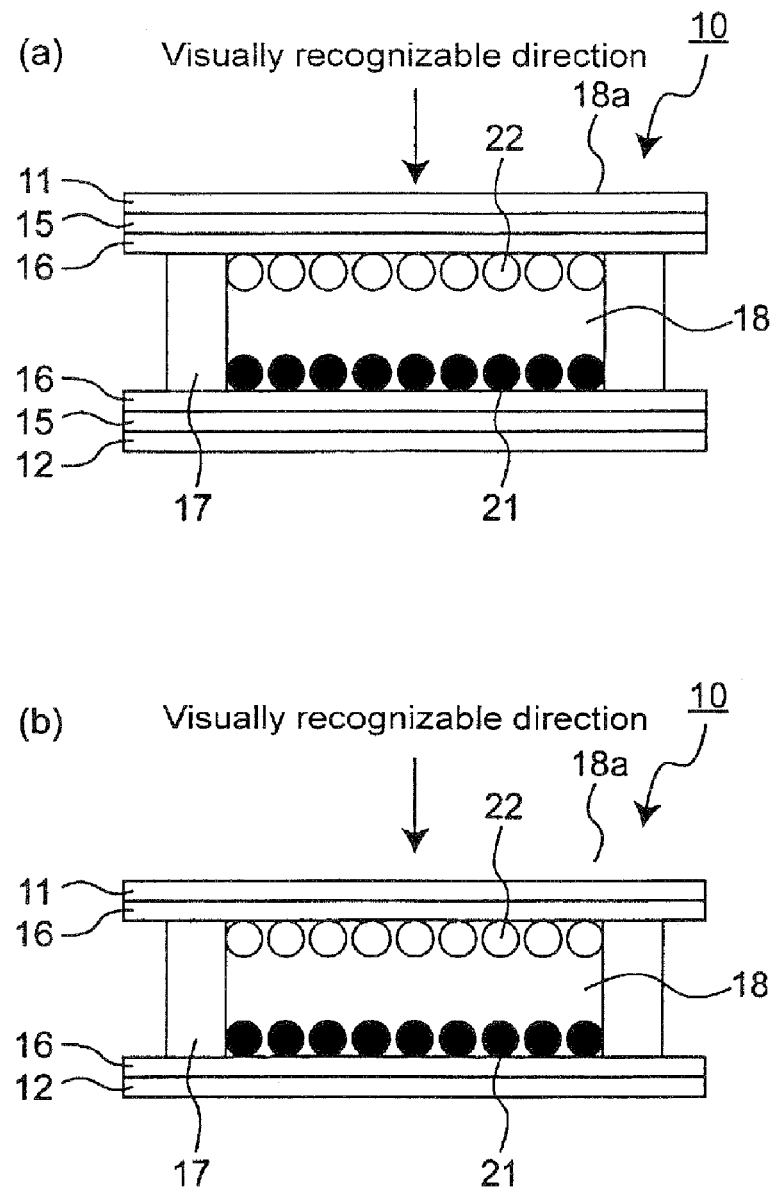
FIGS. 1(a)-(b) are schematic drawings that show a cross-sectional structure of one example of an image display apparatus.

Display particles for an image display apparatus (hereinafter, referred to simply as display particles) of the present invention have a core-shell-type structure in which a shell layer is formed on the surface of each of core particles formed by a so-called pulverizing method, and the resulting particles are sphered into a spherical shape. Since the core particles are formed by the pulverizing method, a high filling rate of a colorant is achieved so that it is possible to improve contrast between an image portion and a non-image portion. Moreover, since the shell layer effectively prevents the colorant from being exposed to the particle surface, and since the sphering provides a predetermined average degree of roundness, the driving voltage can be reduced, and images having sufficiently superior contrast can be repeatedly displayed for a long period of time. In a case where the core particles are formed by a wet method such as an emulsion polymerization method, a suspension polymerization method and a dissolving suspension method, since the amount of filled colorant is limited, the contrast is lowered from the initial stage. In a case where no shell layer is formed, since the colorant is exposed even though the particles are sphered into a spherical shape, it is not possible to obtain sufficient contrast from the initial stage. In a case where the particles are not sphered into a spherical shape, since the contact area with the substrate is large even though each of the particles has a shell layer, the physical adhesive force becomes large, failing to provide sufficient contrast from the initial stage, or causing a high driving voltage.

The display particles to be used in an image display apparatus of the present invention normally include positively chargeable display particles and negatively chargeable display particles. The positively chargeable display particles and negatively chargeable display particles are respectively display particles that exert a positive charge property and display particles that exert a negative charge property, when made in contact with one another in a mixing process, or when made in frictional contact with a reference material such as a carrier serving as a charge-applying material. Those display particles are normally different from each other not only in charging polarities, but also in colors; therefore, upon generation of an electric field between the substrates in an image display apparatus, which will be described later, a displayed image can be visually recognizable based upon a difference in the colors between those display particles that are moved toward the substrate on the upstream side in the visually recognizable direction and allowed to adhere thereto and those display particles that are left on the substrate on the downstream side in the visually recognizable direction and allowed to adhere thereto. For example, one kind of the positively chargeable display particles and the negatively chargeable display particles may be colored into white, while the other kind thereof may be colored into black; thus, a displayed image can be clearly recognized visually.

In the image display apparatus of the present invention, both of the positively chargeable display particles and the negatively chargeable display particles are core-shell-type display particles.

In the present invention, in particular, positively chargeable white display particles exert the aforementioned effects of the core-shell type particles of the present invention most remarkably. In order to improve the degree of whiteness, a white colorant, for example, titanium oxide, is filled in the white display particles at a high filling rate so that the contrast can be greatly improved, and although this tends to cause exposure of the colorant, the present invention makes it possible to prevent such a problem even when the high filling rate is achieved and consequently to effectively improve the degree of whiteness.

The following description will discuss the display particles of the core-shell type of the present invention in more detail.

The core particle in the display particles of the present invention, which is made by kneading and pulverizing at least a binder resin and a colorant, is normally obtained by processes in which, after a binder resin and a colorant, as well as other additives, if necessary, have been mixed and kneaded, the resulting matter is subjected to respective processes such as pulverizing and classifying processes.

As the binder resin for forming the core particles, not particularly limited, any of those resins that have been conventionally used as the binder resin in the field of display particles for image display apparatuses may be used. Examples thereof include: various kinds of known resins such as a styrene-based resin, an acryl-based resin, a styrene-acryl-based copolymer resin, an olefin-based resin, a polyester-based resin, a polyamide-based resin, a polycarbonate resin, a polyether resin, a polyvinyl acetate-based resin, a polysulfone resin, an epoxy resin, a polyurethane resin and a urea resin, and one or two or more of them may be used. The binder resin is preferably designed to have a glass transition point (Tg) of 60 to 90° C., a number-average molecular weight (Mn) of 10000 to 50000 and a molecular-weight distribution (Mw/Mn), that is a ratio between Mn and the weight average molecular weight (Mw), of a range of 2 to 20, because heat is applied thereto during kneading and pulverizing processes.

As the colorant, not particularly limited, various kinds of organic or inorganic pigments and dyes having various colors may be used, and inorganic pigments are preferably contained. In general, it is difficult to fill inorganic pigments to a resin; however, the present invention makes it possible to effectively fill even such inorganic pigments at a high filling rate.

As the white colorant, inorganic pigments such as titanium oxide, zinc white, antimony white and zinc sulfide, and mixtures of these may be used, and among these, titanium oxide is preferably used.

As the black colorant, inorganic pigments such as carbon black, copper oxide, manganese dioxide, aniline black and activated carbon, and mixtures of these may be used, and among these, carbon black is preferably used.

As the blue colorant, examples thereof include: inorganic pigments such as C.I. Pigment Blue 15:3, C.I. Pigment Blue 15, Ultramarine Blue, Cobalt Blue, Alkali Blue Lake, Victoria Blue Lake, Phthalocyanine Blue, Non-Metal Phthalocyanine Blue, partial chloride of Phthalocyanine Blue, Fast Sky Blue and Indanthrene Blue BC, and mixtures thereof.

As the red colorant, examples thereof include: inorganic pigments such as red iron oxide, cadmium red, red lead, mercury sulfide, cadmium, Permanent Red 4R, Lithol Red, Pyrazolone Red, Watching Red, calcium salt, Lake Red D, Brilliant Carmine 6B, Eosin Lake, Rhodamine Lake B, Alizarine Lake, Brilliant Carmine 3B and C.I. Pigment Red 2, and mixtures thereof.

As the yellow colorant, examples thereof include: inorganic pigments such as yellow lead, zinc yellow, cadmium yellow, yellow iron oxide, Mineral Fast Yellow, Nickel Titanium Yellow, Navel Yellow, Naphthol Yellow S, Hansa Yellow G, Hansa Yellow 10G, Benzidine Yellow G, Benzidine Yellow GR, Quinoline Yellow Lake, Permanent Yellow NCG, Tartrazine Lake and C.I. Pigment Yellow 12, and mixtures thereof.

As the green colorant, examples thereof include: inorganic pigments such as Chrome Green, chromium oxide, Pigment Green B, C.I. Pigment Green 7, Malachite Green-Lake and Final Yellow Green G, and mixtures thereof.

As the orange colorant, examples thereof include: red yellow-lead, Molybdenum Orange, Permanent Orange GTR, Pyrazolone Orange, Vulcan Orange, Indanthrene Brilliant Orange RK, Benzidine Orange G, Indanthrene Brilliant Orange GK and C.I. Pigment Orange 31, and mixtures thereof.

As the violet pigment, examples thereof include: inorganic pigments such as Manganese Violet, Fast Violet B and Methyl Violet-Lake, and mixtures thereof.

As the loading pigment, examples thereof include: inorganic pigments such as baryta powder, barium carbonate, clay, silica, white carbon, talc and alumina white, and mixtures thereof.

As various dyes such as basic, acidic, dispersant and direct dyes and the like, examples thereof include: organic dyes such as Nigrosine, Methylene Blue, Rose Bengale, Quinoline Yellow and Ultramarine Blue, and mixtures thereof.

The colorants are appropriately selected and blended on demand so that display particles having a desired color are produced. The following description will mainly discuss white display particles and black display particles; however, the present invention is not intended to be limited only by these combinations.

The content of the colorant is not particularly limited as long as the object of the present invention is achieved, and is normally 1 to 250 parts by weight, in particular, preferably 1 to 200 parts by weight, relative to 100 parts by weight of the binder resin contained in the core particles. In particular, in a case of the white display particles, the content of the white colorant is preferably 30 to 200 parts by weight, in particular, 50 to 150 parts by weight, relative to 100 parts by weight of the binder resin contained in the core particles. For example, in a case of the black display particles, the content of the black colorant is preferably 1 to 50 parts by weight, in particular, 5 to 30 parts by weight, relative to 100 parts by weight of the binder resin contained in the core particles. A plurality of colorants may be combined and contained therein, and in this case, the total amount thereof can be in the above-mentioned range.

The average primary particle size of the colorant, in particular, the pigment, is not particularly limited, and is normally 1 to 500 nm, in particular, preferably 1 to 350 nm, in a case of the white colorant, while it is 1 to 500 nm, in particular, preferably 5 to 100 nm, in a case of the black colorant.

In the present specification, a value measured by the following method is used as the average primary particle size.

A photograph is taken by a scanning electron microscope (generally referred to as SEM) in a magnification of 10,000 times, and an average value of 100 particles in the actual image is used.

Another additive, for example, a charge control agent may be contained in the core particles. When such an additive is contained therein, the additive may be used by being mixed with the binder resin and the colorant.

As the positively chargeable charge control agent, for example, a nigrosine dye, a triphenylmethane-based compound, a quaternary ammonium salt compound, a polyamine resin, imidazole derivatives or the like may be used.

As the negatively chargeable charge control agent, for example, a salicylic acid metal complex, a metal-containing azo dye, a quaternary ammonium salt compound, a calixarene compound, nitroimidazole derivatives or the like may be used.

The volume-average particle size of the core particles is normally 0.5 to 20.0 µm, and preferably 2.0 to 10.0 µm.

In the present specification, the volume-average particle size of the core particles corresponds to a so-called volume reference median diameter (d50 diameter), and can be measured and calculated by using a device in which Multisizer 3 (made by Beckman Coulter, Inc.) is connected to a computer system for use in data processing.

The measuring sequence includes processes in which, after sample particles (0.02 g) have been added to and adapted in 20 ml of a surfactant solution (used for dispersing particles, and formed as a surfactant solution by diluting a neutral detergent containing the surfactant component with pure water ten times as much), the resulting solution is subjected to an ultrasonic dispersing process for 1 minute so that a dispersion solution of the particles is prepared. This particle dispersion solution is injected into a beaker containing ISOTON II (made by Beckman Coulter, Inc.) inside a sample stand by using a pipette until it has reached a measured concentration of 10%, and by setting a measuring machine count to 2500 pieces, a measuring process is carried out. Additionally, the Multisizer 3 having its aperture diameter set to 50 µm is used.

More specifically, the shell layer is formed by fixing and fusing resin fine particles onto the surface of each of the core particles. When a fusing process is performed without carrying out the fixing process, the fusing process is un-uniformly performed to cause an un-uniform shell layer and the subsequent failure to sufficiently suppress the exposure of the colorant, because the resin fine particles are kept in an isolated state from the core particles. Moreover, in a case where no fusing process is carried out after the fixing process, since the isolation of the resin fine particles occurs, with the result that a predetermined core-shell structure is not obtained, failing to suppress the exposure of the colorant.

In the present specification, to "fix" is used as a concept indicating that one portion of each of the resin fine particles is embedded into the surface of each of the core particles so that a joined state due to embedment is formed between the core particles and the resin fine particles.

On the other hand, "to fuse" is used as a concept indicating that the resin is melted in one portion of the interface between the core particles and the resin fine particles so that a joined state due to melting is formed between the core particles and the resin fine particles.

Although not particularly limited, preferably, the fixing and fusing methods for the resin fine particles are normally carried out by a dry method from the viewpoint of carrying out uniform fixing and fusing operations.

The fixing method of the resin fine particles based upon the dry method is not particularly limited, and, for example, a mixing method is proposed in which, for example, core particles and resin fine particles are mixed by using a mixing device that exerts a comparatively weak shearing force with a comparatively small amount of heat generation, such as a Henschel mixer (made by Mitsui Miike Machinery Co., Ltd.).

More specifically, in a case where, for example, the Henschel mixer (made by Mitsui Miike Machinery Co., Ltd.) is used, the fixing process is achieved by mixing the core particles and the resin fine particles at a stirring blade peripheral speed of 50 to 60 m/sec for a stirring time of 10 to 30 minutes. In a case where the stirring blade peripheral speed is too fast or the stirring time is too long, the resin fine particles tend to adhere to the outer wall of the device, failing to be sufficiently fixed onto the surface of each of the core particles, with the result that it is not possible to obtain a predetermined core-shell-type structure. In a case where the stirring blade peripheral speed is too slow or the stirring time is too short, since the resin fine particles are not effectively fixed onto the surface of each of the core particles, it is not possible to form a shell layer.

The fusing method of the resin fine particles fixed onto the surface of each of the core particles based upon the dry method is not particularly limited, and, for example, a mixing method is proposed in which, for example, core particles on which the resin fine particles have been fixed are mixed by using a mixing device that exerts a comparatively strong shearing force with a comparatively large amount of heat generation, such as a Hybridizer (made by Nara Machinery Co., Ltd.).

More specifically, in a case where, for example, the Hybridizer (made by Nara Machinery Co., Ltd.) is used, the core particles on which the resin fine particles have been fixed are mixed by the device at the number of revolutions of 8000 to 12000 rpm for a stirring period of time of 5 to 20 minutes, heat is generated by the shearing process so that the fusing process is achieved. In a case where the number of revolutions is too high or the stirring time is too long, the core particles tend to be pulverized or fixed resin fine particles tend to be isolated, with the result that it is not possible to obtain a predetermined core-shell-type structure. In a case where the number of revolutions is too low or the stirring time is too short, since the resin fine particles are not effectively fused onto the surface of each of the core particles, it is not possible to form a shell layer.

The ratio of use of the resin fine particles for the shell layer is 100 to 300%, in particularly, 100 to 250%, in the rate of the total projection area of the resin fine particles relative to the total surface area of the core particles. In particular, in a case of the white display particles, the ratio of use of the resin fine particles is preferably 150 to 250%. In a case of the black display particles, the ratio of use of the resin fine particles is preferably 100 to 200%. In a case where the ratio of use of the resin fine particles is too small, since the colorant exposed to the surface of each of the core particles is not effectively coated with the resin fine particles (shell layer), a leakage of particles occurs due to an electric field applied onto the particles during endurance operations, resulting in degradation of the contrast. In a case where the ratio of use of the resin fine particles is too large, dielectric polarization of the display particles progresses excessively, making it difficult for the display particles to move, resulting in a high driving voltage. Moreover, in the case of the black particles, since isolated resin fine particles cause a reduction in the density of the black particles, the contrast is lowered.

The ratio of use of the resin fine particles for the shell layer is given as a value calculated by the following method.

Prior to the formation of the shell layer onto the surface of each of the core particles, the total surface area S1 of the entire core particles to be used for the process is calculated from the volume-average particle size of the core particles. Next, based upon the average primary particle size of the resin fine particles for the shell layer, the total projection area S2 of the entire resin fine particles for the shell layer to be used for the process is calculated. Based upon these values, the ratio of use is calculated from the following equation.

Ratio of use of resin fine particles for shell layer (%)= $(S2/S1) \times 100$

As the material for the resin fine particles, not particularly limited, any resin that is used as the binder resin for the core particles may be used; however, the materials are preferably selected in a separated manner between the positively chargeable display particles and the negatively chargeable display particles.

For example, in a case where positively chargeable display particles are produced, resin fine particles that are easily positively charged are preferably used as the resin fine particles for the shell layer. Examples of such resin fine particle materials include a polymer containing as a constituent unit a monomer having one or more functional groups selected from the group consisting of an alkyl group, a cyclohexyl group and an amino group. Specific examples thereof include: a copolymer of cyclohexyl methacrylate/methyl methacrylate, a copolymer of cyclohexyl methacrylate/styrene, a copolymer of methyl methacrylate/styrene and the like.

Moreover, for example, in a case where negatively chargeable display particles are produced, resin fine particles that are easily negatively charged are preferably used as the resin fine particles for the shell layer. Examples of such resin fine particle materials include a polymer containing as a constituent unit a monomer having one or more functional groups selected from the group consisting of polymers containing a monomer having halogen atoms such as fluorine atoms as a constituent unit. Specific examples include a fluoridated acrylate/styrene copolymer and the like.

The glass transition point (Tg) of the resin fine particles for the shell layer is preferably 70 to 95° C., in particular, 75 to 90° C. from the viewpoints of fusing of the resin fine particles to the core particles and a sphering process in water. In particular, supposing that Tg of the resin fine particles for the shell layer is T1 and that Tg of the binder resin of the core particles is T2, the absolute value of a difference between T1 and T2 is preferably 20 to 40° C., in particular, 25 to 35° C., from the view points of fusing of the resin fine particles to the core particles.

The glass transition temperature (Tg) of the resin fine particles for the shell layer and the binder resin of the present invention can be measured by using a differential scanning calorimeter DSC-7 (made by PerkinElmer Co., Ltd.) and a TAC7/DX thermal analyzer controller (made by PerkinElmer Co., Ltd.). In the sequence of measuring processes, a sample (4.5 mg to 5.0 mg) is precisely measured down to two digits below the decimal point, and this is sealed in an aluminum pan (KIT NO. 0219-0041) and set in the sample holder of the DSC-7. An empty aluminum pan is used as a reference. As measuring conditions, under a measuring temperature from 0° C. to 200° C., a temperature raising rate of 10° C./min and a temperature lowering rate of 10° C./min, Heat-Cool-Heat temperature controlling operations are carried out, and based upon the data of the $2^{nd}$ Heat, an analysis is carried out. An extended line of a base line prior to the rise of a first endothermic peak and a tangential line indicating the maximum inclination from the rising portion of the first peak to the peak apex are drawn, and the corresponding intersection point is defined as the glass transition point.

The average primary particle size of the resin fine particles for the shell layer is preferably 30 to 300 nm, and more preferably 50 to 200 nm.

The average primary particle size of the resin fine particles for the shell layer can be measured by using the same method as that used for measuring the average primary particle size of the colorant.

The volume average particle size y2 of the display particles can be measured by using the same method as the measuring method for the core particles, except that the display particles are used as the sample particles. Even when an external additive is externally added to the display particles, the volume average particle size is not changed by externally adding the external additive.

An additive such as a charge control agent may be contained in the shell layer on demand. Upon adding such an additive, the additive may be used by being mixed with the resin fine particles for the shell.

The sphering process of the colorant particles obtained by forming the shell layer on the surface of each of the core particles is carried out by a wet method, and the sphering process is carried out until the colorant particles have an average degree of roundness of 0.960 or more, in particular, in a range from 0.960 to 0.985, and more preferably from 0.960 to 0.980. By carrying out the sphering process of the wet type, it is possible to sphere the particles moderately, and consequently to achieve a predetermined average degree of roundness, while suppressing the isolation of the resin fine particles. In a case where the dry method is used, the separation of the shell layer occurs even if a predetermined average degree of roundness is achieved, and the contrast is lowered from the initial stage. In a case where the average degree of roundness is too small, since the physical adhesive force between particles and substrates becomes greater, problems are raised that the contrast is not sufficiently obtained from the initial stage and that the driving voltage becomes higher.

The average degree of roundness is given as a value measured by using an "FPIA-2100" (made by Sysmex Co.). More specifically, a sample is sufficiently mixed and adapted in an aqueous solution containing a surfactant, and after being dispersed by an ultrasonic dispersing process for one minute, the resulting sample is subjected to a measuring process in a measuring condition HPF (high magnification photographing) mode in an appropriate concentration having a number of HPF detections in a range from 3000 to 10000. In this range, it is possible to obtain reproducible identical measured values. The degree of roundness defined by the following equation was obtained.

Degree of roundness=(Peripheral length of a circle having the same projection area as that of a particle image)/(Peripheral length of projected particle image)

Moreover, the average degree of roundness is a value obtained by dividing the added value of the degrees of roundness of the respective particles by the number of all the particles.

As the sphering method by the wet system, not particularly limited, for example, a method is proposed in which colored particles each formed by fixing and fusing the resin fine particles onto the surface of each of the core particles are dispersed in an aqueous medium, and the entire system is then heated while being stirred.

The aqueous medium comprises water, and is normally prepared as a solution in which a surfactant is dissolved in water. As the surfactant, not particularly limited as long as the dispersion of the colored particles is achieved, any known surfactant such as an anionic surfactant, a cationic surfactant and a nonionic surfactant may be used. Among these, from the viewpoint of dispersion stability of the colored particles, the anionic surfactant is preferably used, and in particular, sodium lauryl sulfate is more preferably used.

The content of the surfactant in the aqueous medium is not particularly limited, and it is normally 0.5 to 10 parts by weight, and more preferably 1 to 5 parts by weight relative to 100 parts by weight of water.

The added amount of the colored particles is normally 1 to 20 parts by weight, and more preferably 3 to 10 parts by weight relative to 100 parts by weight of the aqueous medium.

Supposing that Tg of the resin fine particles for the shell layer is T1, the heating temperature of the aqueous medium is preferably set to T1+0° C. to T1+15° C., in particular, to T1+0° C. to T1+10° C. When the heating temperature is too high, fusion among the colored particles starts to generate aggregated particles. When the heating temperature is too low, the shall agent on the particle surface is not melted, failing to carry out a predetermined sphering process.

The heating time is preferably set to 10 to 60 minutes, and more preferably to 20 to 40 minutes. When the heating time is too long, fusion among the colored particles starts to generate aggregated particles. When the heating time is too short, the shell agent on the particle surface is not melted, failing to carry out a predetermined sphering process.

The shell layer obtained by such a sphering process may have a form of a resin fine particle layer with interfaces being located among the resin fine particles, or a form of a resin layer with the interfaces being eliminated by the melting among the resin fine particles caused by the sphering process. The shell layer may also have a composite form between these forms.

After the sphering process, display particles obtained in an aqueous medium are normally subjected to repeated filtering/washing processes, and then dried. As the drying process, any known method may be adopted; however, from the viewpoint of productivity, a spray drying process is preferably carried out.

The display particles produced by the above-mentioned method are normally used with an external additive being added and mixed therewith. As the external additive, known external additive conventionally used in the field of the display particles for an image display apparatus may be used, and examples thereof include: silica, titania and the like.

The external additive is preferably surface-treated by a hydrophobizing agent, and then used, from the viewpoint of reducing physical adhesive force among the display particles, as well as between the display particles and the electrodes.

As the hydrophobizing agent for the external additive, not particularly limited, those known hydrophobizing agents in the field of the display particles may be used. Among these, an external additive, which is treated by a hydrophobizing agent of organic silazanes such as hexamethyldisilazane, trimethyldisilazane, tetramethyldisilazane, hexamethylcyclotrisilazane, and heptamethyldisilazane, is effectively used as an external additive for negatively chargeable display particles. Moreover, for example, an external additive, which is treated by a hydrophobizing agent of aminosilane coupling agents such as 4-aminobutyldimethylmethoxysilane, 4-aminobutyltriethoxysilane, (aminoethylaminomethyl)phenethyltrimethoxysilane, N-(2-aminoethyl)-3-aminopropylmethyldimethoxysilane, N-(2-aminoethyl)-3-aminopropyltriethoxysilane, N-(2-aminoethyl)-3-aminopropyltris (2-ethylhexoxy) silane, 6-(aminohexylaminopropyl)trimethoxysilane, p-aminophenyltrimethoxysilane, aminophenyltriethoxysilane, 3-(1-aminopropoxy)3,3-dimethyl-1-propenyltrimethoxysilane, 3-aminopropyldiethylmethylsilane, 3-aminopropyltris (methoxyethoxyethoxy)silane, 3-aminopropyldimethylethoxysilane, 3-aminopropylmethyldiethoxysilane, 3-aminopropyltriethoxysilane, 3-aminopropyltrimethoxysilane, 3-aminopropyltris(trimethylsiloxy)silane, ω-aminoundecyltrimethoxysilane and amino-modified silicone oil, is effectively used as an external additive for positively chargeable display particles.

The average primary particle size of the external additive is 10 to 200 nm, and preferably 30 to 100 nm.

Although not particularly limited, the added amount of the external additive is normally 1 to 20 parts by weight, and more preferably 5 to 10 parts by weight relative to 100 parts by weight of the display particles.

In the display particles of the present invention described above, since exposure of the colorant onto the particle surface is effectively prevented, even when the colorant is filled at a comparatively high filling rate, it is possible to form an image having an appropriate reflection density for a long period of time and consequently to maintain superior contrast.

For example, the white display particles of the present invention, obtained by using the white colorant, make it possible to preferably maintain the reflection density A to be measured by a specific method to 0.70 or less, preferably 0.60 or less, and more preferably, in a range from 0.30 or more to 0.60 or less, for a long period of time.

In the present specification, the reflection density A is given as a value measured in accordance with the evaluation method of Examples.

Image Display Apparatus

An image display apparatus of the present invention is characterized by including the above-mentioned display particles. The following description will discuss the image display apparatus of the present invention in detail.

In the image display apparatus of the present invention, the display particles are sealed between two substrates at least one of which is transparent, and by generating an electric field between the substrates, the display particles are moved in a gaseous phase so that an image is displayed.

FIG. 1 shows typical cross sections of image display apparatuses of the present invention. FIG. 1(a) shows a structure in which an electrode 15 having a layer structure is formed on each of substrates 11 and 12, with an insulating layer 16 being formed on the surface of each electrode 15. An image display apparatus shown in FIG. 1(b) has a structure in which no electrode is formed in the apparatus, and is designed so that an electric field is applied by electrodes formed on the outside of the apparatus so as to move the display particles. In FIG. 1(a) and FIG. 1(b), the same reference numerals represent the same member. FIG. 1 indicates FIG. 1(a) and FIG. 1(b) in a manner to be included therein. An image display apparatus 10 of FIG. 1 is supposed to be used for viewing images from the substrate 11 side as shown in the Figure; however, the present invention is not intended to be limited by the structure in which images are viewed from the substrate 11 side. Moreover, since no electrode 15 is attached to the apparatus, the apparatus having a type shown in FIG. 1(b) can be simplified in its apparatus structure and is advantageous in that its manufacturing processes can be shortened. FIG. 3 shows a state in which the image display apparatus 10 of the type shown in FIG. 1(b) is set in a device capable of applying a voltage so that the voltage is applied thereto. Additionally, the cross-sectional structure of the image display apparatus of the present invention is not intended to be limited by those shown in FIGS. 1(a) and 1(b).

On the outermost portion of the image display apparatus 10 of FIG. 1(a), two opposed substrates 11 and 12, which form a box unit forming the image display apparatus, are disposed. Electrodes 15 used for applying a voltage are formed on the respective surfaces on the opposed sides of the substrates 11 and 12, and insulating layers 16 are further formed on the respective electrodes 15. The electrode 15 and the insulating layer 16 are formed on each of the substrates 11 and 12, and display particles are located in a gap 18 that is formed by aligning the faces each having the electrode 15 and the insulating layer 16 to be made face to face with each other. In the image display apparatus 10 shown in FIG. 1, two kinds of display particles, that is, negatively charged black display particles 21 (hereinafter, referred to as black particles) and positively charged white display particles 22 (hereinafter, referred to as white particles), are located as display particles between a gap 18. Moreover, in the image display apparatus 10 of FIG. 1, the gap 18 has a structure in which four sides thereof are surrounded by the substrates 11, 12 and the two barrier ribs 17, with the display particles being sealed in the gap 18 in a powder state.

Although not particularly limited as long as sealed display particles are allowed to move, and set in a range capable of maintaining the contrast, the thickness of the gap 18 is normally in a range from 10 μm to 500 μm, and preferably from 10 μm to 100 μm. The volume-filling-ratio of the display particles within the gap 18 is 5% to 70%, and preferably 30% to 60%. By setting the volume-filling-ratio of the display particles within the above-mentioned range, the display particles in the gap 18 are allowed to move smoothly, and it becomes possible to obtain an image with superior contrast.

Next, the following description will discuss behaviors of display particles in the gap 18 of the image display apparatus 10.

In the image display apparatus of the present invention, upon application of a voltage between the two substrates so that an electric field is formed therein, display particles charged between the substrates are allowed to move in the electric field direction. In this manner, by applying a voltage between the substrates where the display particles are located, the charged display particles are allowed to move between the substrates so that an image displaying operation is carried out.

The image displaying operation in the image display apparatus of the present invention is carried out through the following sequence of processes.

(1) Display particles to be used as display media are charged by using a known method such as frictional charging by using a carrier or the like.

(2) The display particles are sealed between two opposed substrates, and in this state, a voltage is applied between the substrates.

(3) By the voltage application between the substrates, an electric field is formed between the substrates.

(4) The display particles are attracted toward the substrate surfaces in the electric field direction on the side opposite to the polarity of the display particles by a function of a force of the electric field between the electrodes so that an image displaying operation is carried out.

(5) Moreover, by changing the electric field direction between the substrates, the moving directions of the display particles are switched. By switching the moving directions, it is possible to change the image display in various ways.

As the charging method of display particles by the above-mentioned known method, for example, a method is proposed in which the display particles are made in contact with the carrier so as to charge them by frictional charging, and another method is proposed in which display particles of two colors having different charging polarities are mixed and stirred so that the display particles are charged by frictional charging among the particles. In the present invention, the display particles are preferably charged by using the carrier, and the charged display particles are sealed between the substrates.

FIGS. 2 and 3 show examples of movements of display particles in response to a voltage application between the substrates.

FIG. 2(a) shows a state prior to the voltage application between substrates 11 and 12, and prior to the voltage application, positively charged white particles 22 are located near the substrate 11 on the visible side. This state shows that the image display apparatus 10 displays a white image. Moreover, FIG. 2(b) shows a state after the voltage application to the electrode 15 in which negatively charged black particles 21 are moved close to the substrate 11 on the visible side by a positive voltage application to the substrate 11, while the white particles 22 are moved to the substrate 12 side. In this state, the image display apparatus 10 displays a black image.

FIG. 3 show a structure in which the image display apparatus 10 shown in FIG. 1(b) of a type without electrodes is connected to a voltage application device 30, and also show a state prior to a voltage application in this state (FIG. 3(a)) and a state after the voltage application (FIG. 3(b)). In the same manner as in the image display apparatus 10 having the electrode 15, the image display apparatus 10 of the type shown in FIG. 1(b) also has a state in which negatively charged black particles 21 are moved close to the substrate 11 on the visible side by the positive voltage application to the substrate 11, while the positively charged white particles 22 are moved to the substrate 12 side.

The following description will discuss substrates 11 and 12, an electrode 15, an insulating layer 16 and barrier ribs 17 that constitute the image display apparatus 10 shown in FIG. 1.

First, the substrates 11 and 12 forming the image display apparatus 10 will be described. In the image display apparatus 10, since the viewer visually recognizes an image formed by the display particles from at least one of the sides of the substrates 11 and 12, the substrate to be placed on the visible side by the viewer needs to be formed by a transparent material. Therefore, the substrate to be used on the image visible side by the viewer is preferably formed by a light-transmitting material having a visible light transmittance of 80% or more, and the visible light transmittance of 80% or more makes it possible to provide sufficient visibility. Of the substrates forming the image display apparatus 10, the substrate to be placed on the side opposite to the image visible side is not necessarily made from a transparent material.

The thicknesses of the substrates 11 and 12 are preferably 2 µm to 5 mm, and more preferably 5 µm to 2 mm, respectively. When the thicknesses of the substrates 11 and 12 are within the above-mentioned range, it is possible to allow the image display apparatus 10 to have sufficient strength, with the gap between the substrates being maintained uniformly. Moreover, by setting the thicknesses of the substrates within the above-mentioned range, a compact, light-weight image display apparatus can be provided so that the application of the image display apparatus can be promoted in a wider field. Moreover, by setting the thickness of the substrate on the image visible side within the above-mentioned range, it is possible to provide accurate visual recognition of a displayed image and consequently to prevent problems with display quality.

As the material having a visible light transmittance of 80% or more, examples thereof include an inorganic material having no flexibility such as glass and quartz, an organic material typically represented by a resin material which will be described later, and a metal sheet. Among these, the organic material and the metal sheet allow the image display apparatus to have a certain degree of flexibility. As the resin material capable of providing a visible light transmittance of 80% or more, for example, polyester resins, typically represented by polyethylene terephthalate and polyethylene naphthalate, polycarbonate resin, polyether sulfone resin, polyimide resin and the like may be used. Moreover, transparent resins, obtained by radical-polymerizing a vinyl-based polymerizable monomer, such as acrylic resin, that is a polymer of acrylic acid esters and methacrylic acid esters, typically represented by polymethyl methacrylate (PMMA) or polyethylene resin, may be used.

The electrodes 15 are formed on the surfaces of the substrates 11 and 12, and used for forming an electric field between the substrates, that is, in the gap 18, by applying a voltage. In the same manner as in the aforementioned substrates, the electrode 15 to be formed on the image visible side to the viewer needs to be formed by using a transparent material.

The thickness of the electrode to be formed on the image visible side needs to be set to such a level as to ensure conductivity and also to avoid problems with light-transmitting property, and more specifically, it is preferably 3 nm to 1 µm, and more preferably 5 nm to 400 nm. Moreover, the visible light transmittance of the electrode to be formed on the image visible side is preferably 80% or more, in the same manner as that of the substrate. The thickness of the electrode to be placed on the side opposite to the image visible side is preferably within the above-mentioned range, but the electrode is not required to be made from a transparent material.

As the constituent material for the electrodes 15, examples thereof include: a metal material and a conductive metal oxide, or a conductive polymer material. Specific examples of the metal material include: aluminum, silver, nickel, copper, gold and the like, and specific examples of the conductive metal oxide include: indium-tin oxide (ITO), indium oxide, antimony-tin oxide (ATO), tin oxide, zinc oxide and the like.

Moreover, examples of the conductive polymer material include: polyaniline, polypyrrole, polythiophene, polyacetylene, and the like.

As the method for forming the electrodes 15 on the substrates 11 and 12, for example, in the case of forming a thin-film electrode, a sputtering method, a vacuum vapor deposition method, a chemical vapor deposition method (CVD method) and a coating method are proposed. Moreover, another method may be proposed in which a conductive material is mixed in a solvent and a binder resin and this mixture is applied to a substrate so as to form an electrode.

The insulating layer 16 is formed on the surface of the electrode 15, and has such a structure that the surface of the insulating layer 16 is made in contact with the display particles 21 and 22. The insulating layer 16 has a function for alleviating a change in quantity of charge due to a voltage applied upon moving the display particles 21 and 22. Moreover, by applying a resin having a structure that exerts high hydrophobicity or irregularities thereto, the insulating layer makes it possible to reduce the physical adhesion force to the display particles, and consequently to reduce the driving voltage. As the material for forming the insulating layer 16, such a material that has an electrical insulating property, can be formed into a thin film, and also has a transparent property, if necessary, may be used. The insulating layer to be formed on the image visible side is preferably designed to have a visible light transmittance of 80% or more in the same manner as in the substrate. Specific examples thereof include: a silicone resin, an acrylic resin, a polycarbonate resin, and the like.

The thickness of the insulating layer 16 is preferably 0.01 µm or more to 10.0 µm or less. That is, when the thickness of the insulating layer 16 is within the above-mentioned range, it is possible to move the display particles 21, 22 without the necessity of applying an excessively high voltage between the electrodes 15, and this structure is preferable because, for example, an image displaying process can be carried out by applying a voltage in such a level as to be applied during an image forming process by the use of an electrophoretic method.

The barrier rib 17 is used for ensuring the gap 18 between the up and down substrates, and as shown on the right side and left side in the upper stage of FIG. 4, this may be formed not only on the edge portion of the substrate 11, 12, but also inside thereof, if necessary. The width of the barrier rib 17, in particular, the thickness of the barrier rib on the image display surface 18*a* side, is preferably made as thin as possible from the viewpoint of ensuring clearness of a displayed image, as shown on the right side in the upper stage of FIG. 4.

The barrier rib 17 to be formed inside of the substrate 11, 12 may be formed continuously, or may be formed intermittently, in a direction from the surface to the rear face, in figures shown on the right side and left side in the upper stage of FIG. 4.

By controlling the shape and configuration of the barrier ribs 17, the cell of the gap 18 divided by the barrier ribs 17 can be placed with various shapes. Examples of the shape and configuration of the cells at the time when the gap 18 is viewed in the visually recognizable direction of the substrate 11 are shown in the lower stage of FIG. 4. As shown in the lower stage of FIG. 4, a plurality of cells with a square shape, a triangular shape, a line shape, a round shape, a hexagonal shape or the like can be disposed into a honeycomb shape and a network shape.

The barrier ribs 17 can be formed by carrying out a shaping process on the substrate on the side opposite to the image-recognizing side, for example, by using the following method. As the method for shaping the barrier ribs 17, for example, a method for forming irregularities by using an embossing process and a thermal press injection molding process to be carried out on a resin material or the like, a photolithography method, a screen printing method and the like are proposed.

The image display apparatus of the present invention can be manufactured by an electrophotographic developing system as described below.

An electrode 15 and an insulating layer 16, if necessary, are formed on each of two substrates 11, 12 so that a pair of substrates with electrodes formed thereon are obtained. By mixing the display particles 21 and a carrier 210, the display particles 21 are negatively charged, and the mixtures (21, 210) are placed on a conductive stage 100 as shown in FIG. 5(a), and one of the substrates with the electrodes is placed with a predetermined gap being set from the stage 100. Next, as shown in FIG. 5(a), a DC voltage having a positive polarity and an AC voltage are applied to the electrode 15 so that negatively charged display particles 21 are allowed to adhere onto the insulating layer 16.

By mixing the display particles 22 and a carrier 220, the display particles 22 are positively charged, and the mixtures (22, 220) are placed on the conductive stage 100, as shown in FIG. 5(b), and the other substrate with electrode is placed with a predetermined gap being set from the stage 100. Next, as shown in FIG. 5(b), a DC voltage having a negative polarity and an AC voltage are applied to the electrode 15 so that positively charged display particles 22 are allowed to adhere onto the insulating layer 16. The substrate with electrode to which negatively charged display particles have been adhered and the substrate with electrode to which positively charged display particles have been adhered are superposed as shown in FIG. 5(c) by adjusting the barrier rib so as to form a predetermined gap, and the peripheral portions of the substrates are bonded so that an image display apparatus can be obtained.

As the carrier 210 used for negatively charging the display particles, for example, a coat-type carrier formed by coating magnetic particles such as ferrite with a resin such as a cyclohexylmethacrylate resin is effectively used.

As the carrier 220 used for positively charging the display particles, for example, a coat-type carrier formed by coating magnetic particles such as ferrite with a resin such as a fluoridated acrylate resin is effectively used.

EXAMPLES

Example 1

White Display Particles

To 100 parts by weight of a styrene acrylic resin (weight average molecular weight: 20000, Tg: 65° C.) was added rutile type titanium oxide (average primary particle size: 150 nm) (150 parts by weight) in a Henschel mixer (made by Mitsui Miike Machinery Co., Ltd.), and these were mixed for 5 minutes, with a peripheral speed of the stirring blades being set to 25 m/s, so that a mixture was prepared.

The above-mentioned mixture was kneaded by a twin-screw extrusion kneader, and coarsely pulverized by a hummer mill, and then subjected to a grinding process by a turbo-mill grinder (made by Turbo Kogyo Co., Ltd.), and further subjected to a fine-particle classifying process by a gas-flow classifier utilizing a Coanda effect so that white core particles having a volume-average particle size of 8.2 μm and CV=20 were produced.

Next, the above-mentioned white core particles (100 parts by weight) and resin fine particles for a shell (average primary particle size: 100 nm; cyclohexyl methacrylate/methyl methacrylate=5/5; Tg: 92° C.)(6.2 parts by weight) (ratio of use: 200%) were loaded into a Henschel mixer, and mixed for 30 minutes, with the peripheral speed of the stirring blades being set to 55 m/sec, so that a fixing process was carried out. The mixture was further mixed for 10 minutes at 10000 rpm by using a Hybridizer (made by Nara Machinery Co., Ltd.) for a fusion (fusing process). The mixture (5 parts by weight) was further dispersed in an aqueous medium (100 parts by weight) by using a stirrer, and this was then stirred for 30 minutes at 95° C. by a stirrer (sphering process), and washed and dried so that white particles were produced. The aqueous medium was prepared by dissolving 3 parts by weight of dodecylbenzene sulfonate serving as a surfactant in 100 parts by weight of water.

Thereafter, 5.0 parts by weight of silica fine particles (average primary particle size: 100 nm) that had been amino-coupling treated were added to the white particles, and by using a Henschel mixer, these were mixed for 30 minutes, with a peripheral speed of the stirring blades being set to 55 m/s, so that a fixing treatment was carried out. Successively, 1.0 part by weight of titania particles having an average primary particle size of 30 nm that had been amino-coupling treated were added thereto, and the same processes were carried out by using the Henschel mixer so that white display particles were produced.

Carrier A for White Display Particles

A carrier for use in charging the white display particles was produced by using the following method. To 100 parts by weight of ferrite cores having an average particle size of 80 μm were added 2 parts of fluoridated acrylate resin particles, and these materials were put into a horizontal rotation blade type mixer, and mixed and stirred at 22° C. for 10 minutes under a condition of 8 m/sec in the peripheral speed of the horizontal rotation blades, and the resulting mixture was then heated to 90° C., and stirred for 40 minutes so that the carrier was prepared.

Black Display Particles

To 100 parts by weight of a styrene acrylic resin (weight average molecular weight: 20000, Tg: 65° C.) was added carbon black (average primary particle size: 30 nm)(8 parts by weight) in a Henschel mixer (made by Mitsui Miike Machinery Co., Ltd.), and these were mixed for 5 minutes, with a peripheral speed of the stirring blades being set to 25 m/s, so that a mixture was prepared.

The above-mentioned mixture was kneaded by a twin-screw extrusion kneader, and coarsely pulverized by a hummer mill, and then subjected to a grinding process by a turbo-mill grinder (made by Turbo Kogyo Co., Ltd.), and further subjected to a fine-particle classifying process by a gas-flow classifier utilizing a Coanda effect so that black core particles having a volume-average particle size of 8.0 μm and CV=23 were produced.

Next, the above-mentioned black core particles (100 parts by weight) and resin fine particles for a shell (average primary particle size: 100 nm; fluoridated acrylate/styrene=1/9; Tg: 89° C.) (5.8 parts by weight) (ratio of use: 150%) were loaded into a Henschel mixer, and mixed for 30 minutes, with the peripheral speed of the stirring blades being set to 55 m/sec, so that a fixing process was carried out. The mixture was further mixed for 10 minutes at 10000 rpm by using a Hybridizer (made by Nara Machinery Co., Ltd.) for a fusion (fusing process). The mixture (3 parts by weight) was further dispersed in an aqueous medium (100 parts by weight) by using a stirrer, and this was then stirred for 30 minutes at 90° C. by a stirrer (sphering process), and washed and dried so that black particles were produced. The aqueous medium was prepared by dissolving 3 parts by weight of dodecylbenzene sulfonate serving as a surfactant in 100 parts by weight of water.

Thereafter, 5.0 parts by weight of silica fine particles (average primary particle size: 100 nm) that had been treated by hexamethyldisilazane were added to the black particles, and by using a Henschel mixer, these were mixed for 30 minutes, with a peripheral speed of the stirring blades being set to 55 m/s, so that a fixing treatment was carried out. Successively, 1.0 part by weight of titania particles having an average primary particle size of 30 nm that had been amino-coupling treated were added thereto, and the same processes were carried out by using the Henschel mixer so that black display particles were produced. Successively, 1.0 part by weight of titania particles having an average primary particle size of 30 nm that had been treated with hexamethyldisilazane were added thereto, and the same processes were carried out by using the Henschel mixer so that black display particles were produced.

Carrier B For Black Display Particles

A carrier for use in charging the black display particles was produced by using the following method. To 100 parts by weight of ferrite cores having an average particle size of 80 μm were added 2 parts by weight of cyclohexylmethacrylate resin particles, and these materials were put into a horizontal rotation blade type mixer, and mixed and stirred at 22° C. for 10 minutes under a condition of 8 m/sec in the peripheral speed of the horizontal rotation blades. The resulting mixture was then heated to 90° C., and stirred for 40 minutes so that carrier B was prepared.

Production of Image Display Apparatus

An image display apparatus was manufactured in accordance with the following method so as to have the same structure as that of FIG. 1(a). Two sheets of glass substrates, each having a length of 80 mm, a width of 50 mm and a thickness of 0.7 mm, were prepared, and an electrode 15, made of an indium-tin oxide (ITO) coat film (resistance: 30Ω/□) having a thickness of 300 nm, was formed on each of the substrate surfaces by using a vapor deposition method. A coating solution prepared by dissolving 12 g of a polyamide resin in a mixed solvent containing 80 ml of tetrahydrofuran and 20 ml of cyclohexanone was applied to the electrodes by a spin coating method so that an insulating layer 16 having a film thickness of 2 μm was formed on each of the electrodes; thus, a pair of substrates with electrodes were obtained.

Black display particles (1 g) and carrier B (9 g) were mixed by a shaker (YS-LD, made by Yayoi Co., Ltd.) for 30 minutes so that the display particles were charged. The resulting mixtures (21, 210) were put on a conductive stage 100, as shown in FIG. 5(a), and one of the substrates with electrodes was disposed with a gap of about 2 mm being set from the stage 100. Between the electrode 15 and the stage 100, a DC bias of +50V and an AC bias of 2.0 kV were applied with a frequency of 2.0 kHz for 10 seconds so that the black display particles 21 were allowed to adhere onto the insulating layer 16.

White display particles (1 g) and carrier A (9 g) were mixed by a shaker (YS-LD, made by Yayoi Co., Ltd.) for 30 minutes so that the display particles were charged. The resulting mixtures (22, 220) were put on a conductive stage 100, as shown in FIG. 5(b), and the other substrate with electrode was disposed with a gap of about 2 mm being set from the stage 100. Between the electrode 15 and the stage 100, a DC bias of −50V and an AC bias of 2.0 kV were applied with a frequency of 2.0 kHz so that the white display particles 22 were allowed to adhere onto the insulating layer 16.

As shown in FIG. 5(c), the substrate with electrode to which the black display particles were adhered and the substrate with electrode to which the white display particles were adhered were superposed so as to have a gap of 50 μm by making adjustments by ribs, and the peripheral portions of the substrates were bonded to each other with an epoxy-based adhesive so that an image display apparatus was prepared. Additionally, the volume-filling-ratio of each of the two kinds of display particles between glass substrates was 50%. The content ratio between the white display particles and black display particles was virtually 1/1 in number ratio of white display particles/black display particles.

Examples 2 to 7

An image display apparatus was manufactured by using the same method as that of example 1, except that, upon production of the white display particles and black display particles, the ratio of use of the resin fine particles for a shell was adjusted.

Comparative Example 1

An image display apparatus was manufactured by using the same method as that of example 1, except that, upon production of the white display particles and black display particles, the shell-forming process was not carried out and that the sphering process was not carried out.

Comparative Example 2

An image display apparatus was manufactured by using the same method as that of example 1, except that, upon production of the white display particles and black display particles, the sphering process was not carried out.

Comparative Example 3

An image display apparatus was manufactured by using the same method as that of example 1, except that, upon production of the white display particles and black display particles, the fixing process was not carried out when the shell-forming process was executed.

Comparative Example 4

An image display apparatus was manufactured by using the same method as that of example 1, except that, upon production of the white display particles and black display particles, the fusing process was not carried out when the shell-forming process was executed.

Comparative Examples 5 to 8

An image display apparatus was manufactured by using the same method as that of example 1, except that, upon production of the white display particles and black display particles, the ratio of use of the resin fine particles for a shell was adjusted.

TABLE 1

| | Resin fine particles for shell Ratio of use (%) | | Shell-forming process[2] | | Average degree of roundness | | Initial state | |
|---|---|---|---|---|---|---|---|---|
| | White display particles | Black display particles | Fixing process | fusing process | White display particles | Black display particles | White density | Black density |
| Example 1 | 200 | 150 | ○ | ○ | 0.968 | 0.968 | 0.49 | 1.56 |
| Example 2 | 150 | 150 | ○ | ○ | 0.972 | 0.972 | 0.45 | 0.60 |
| Example 3 | 250 | 150 | ○ | ○ | 0.975 | 0.975 | 0.48 | 1.58 |
| Example 4 | 200 | 100 | ○ | ○ | 0.974 | 0.974 | 0.50 | 1.53 |
| Example 5 | 200 | 200 | ○ | ○ | 0.981 | 0.981 | 0.43 | 1.61 |
| Example 6 | 200 | 300 | ○ | ○ | 0.972 | 0.968 | 0.45 | 1.63 |
| Example 7 | 300 | 150 | ○ | ○ | 0.973 | 0.969 | 0.42 | 1.61 |
| Comparative Example 1 | 0[1] | 0[1] | X | X | 0.923 | 0.923 | 0.50 | 1.50 |
| Comparative Example 2 | 200 | 150 | ○ | ○ | 0.925 | 0.928 | 0.49 | 1.47 |
| Comparative Example 3 | 200 | 150 | X | ○ | 0.962 | 0.963 | 0.53 | 1.53 |
| Comparative Example 4 | 150 | 150 | ○ | X | 0.963 | 0.968 | 0.56 | 1.50 |
| Comparative Example 5 | 200 | 90 | ○ | ○ | 0.973 | 0.973 | 0.53 | 1.63 |
| Comparative Example 6 | 90 | 150 | ○ | ○ | 0.968 | 0.970 | 0.52 | 1.50 |
| Comparative Example 7 | 200 | 310 | ○ | ○ | 0.964 | 0.969 | 0.53 | 1.60 |
| Comparative Example 8 | 310 | 150 | ○ | ○ | 0.965 | 0.968 | 0.51 | 1.61 |

| | Initial state | | Endurance state Contrast | | Minimum driving voltage | | Reflection density A |
|---|---|---|---|---|---|---|---|
| | Contrast | Determination | durability (%) | Determination | (V) | Determination | Initial/Endurance |
| Example 1 | 1.07 | ○ | 90 | ○ | 50 | ⊙ | 0.49/0.52 |
| Example 2 | 1.15 | ○ | 89 | ○ | 50 | ⊙ | 0.45/0.53 |
| Example 3 | 1.10 | ○ | 82 | ○ | 50 | ⊙ | 0.48/0.56 |
| Example 4 | 1.03 | ○ | 75 | Δ | 100 | ○ | 0.46/0.57 |
| Example 5 | 1.18 | ○ | 81 | ○ | 100 | ○ | 0.47/0.52 |
| Example 6 | 1.18 | ○ | 84 | ○ | 150 | Δ | 0.42/0.53 |
| Example 7 | 1.19 | ○ | 80 | ○ | 150 | Δ | 0.42/0.56 |
| Comparative Example 1 | 1.00 | ○ | 59 | X | 200 | X | 0.48/0.72 |
| Comparative Example 2 | 0.98 | Δ | 75 | Δ | 200 | X | 0.49/0.74 |
| Comparative Example 3 | 1.00 | ○ | 69 | X | 200 | X | 0.50/0.73 |
| Comparative Example 4 | 0.94 | X | 68 | X | 250 | X | 0.45/0.77 |
| Comparative Example 5 | 1.10 | ○ | 69 | X | 200 | X | 0.42/0.72 |
| Comparative Example 6 | 0.98 | Δ | 72 | Δ | 200 | X | 0.45/0.75 |
| Comparative Example 7 | 1.07 | ○ | 81 | ○ | 250 | X | 0.49/0.75 |
| Comparative Example 8 | 1.10 | ○ | 81 | ○ | 250 | X | 0.51/0.76 |

[1] No shell was formed
[2] The shell-forming process was carried out commonly on the white display particles and black display particles.

Evaluation

Contrast

DC voltages of +250V and −250V were alternately applied to an image display apparatus repeatedly 10000 times, and by measuring the reflection density of a displayed image obtained by the voltage application, the display characteristic was evaluated. The voltage to be applied to the electrode on the upstream side in the visually recognizable direction of the image display apparatus was changed, while the other electrode was electrically earthed. Densities at five points on the display surface were randomly measured by using a reflection densitometer "RD918 (manufactured by Macbeth Process Measurements Co.)", and the density was obtained as the average value of these.

Evaluating processes were carried out on white density, black density and contrast in the initial state, as well as on contrast after endurance operations. Evaluations in the initial state were obtained after alternately carrying out voltage applications of +250 V and −250V repeatedly ten times, and evaluations after endurance operations were obtained after alternately carrying out voltage applications of +250 V and −250V repeatedly 10000 times. The applied time of each of the voltages was 0.2 seconds.

Initial Contrast

The white density, black density and contrast were evaluated.

The contrast was evaluated based upon a density difference between the black density and the white density.

The black density corresponds to a reflection density on the display surface obtained upon application of a voltage of +250V to the electrode on the upstream side in the visually recognizable direction of the image display apparatus.

The white density corresponds to a reflection density on the display surface obtained upon application of a voltage of −250V to the electrode on the upstream side in the visually recognizable direction of the image display apparatus.

When the density difference was 1.00 or more, the contrast was evaluated as superior (◯), when it was 0.95 or more, the contrast was evaluated as acceptable (Δ) and when it was less than 0.95, the contrast was evaluated as rejected (×).

Contrast after Endurance Operations

The contrast durability was evaluated.

The contrast durability was indicated by a ratio (%) of the contrast after endurance operations to the initial contrast.

In the evaluations of the contrast durability, 80% or more was rated as superior (◯), 70% or more was rated as acceptable (Δ) and less than 70% was rated as rejected (×).

Minimum Driving Voltage

The minimum driving voltage is defined as a voltage V1 at a time when the value of the display density is given as the following value, upon voltage application, with the voltage being changed with 10V intervals from 0V to +250V.

$$\text{Display density} = CW + \{(CB - CW) \times 0.1\}$$

In this case, the black density measured in the initial evaluation of the contrast is "CB" and the white density thereof is "CW".

With respect to the minimum driving voltage, 50V or less was rated as most superior (⊙), less than 150V was rated as superior (◯), a range from 150V or more to less than 200V was rated as acceptable (Δ) and 200V or more was rated as rejected (×).

Reflection Density A

The reflection density A corresponds to a white density upon application of predetermined white display particles and black display particles obtained in example 1 in combination, and the white density was measured at the initial state, as well as after endurance operations, by using the following method.

First, an image display apparatus was manufactured by using the same method as that of example 1, except that the white display particles used in the respective Examples/Comparative Examples and the black display particles obtained in example 1 were used.

Next, driving operations were carried out by using the same methods as the evaluation methods of the initial contrast and the contrast after endurance operations, except that the image display apparatus thus obtained was used. The white density in each of the initial stage (after repetitive operations of 10 times) and the stage after the endurance operations (after repetitive operations of 10000 times) was shown as a reflection density A.

EFFECTS OF THE INVENTION

The display particles for an image display apparatus of the present invention make it possible to effectively suppress the exposure of a colorant onto the particle surface, and to provide high degree of sphericity; therefore, it becomes possible to reduce a driving voltage, and to repeatedly display images having sufficiently superior contrast between an image portion and a non-image portion for a long period of time. Since the exposure suppressing effect of the colorant can be effectively obtained even when the colorant is filled in a high level, the high filling level of the colorant makes it possible to further improve the contrast.

In particular, the white display particles, obtained with the white colorant being filled in the high level, make it possible to effectively suppress the exposure of the colorant on the particle surface, and also to provide high degree of sphericity so that a sufficient whiteness degree can be obtained.

What is claimed is:

1. Display particles for an image display apparatus, wherein the image display apparatus comprises two substrates at least one of which is transparent, with the display particles being sealed between the substrates in a powder state, so that by generating an electric field between the substrates, the display particles are moved to display an image,
   wherein the display particles comprise core particles comprising at least a binder resin and a colorant and resin fine particles fixed and fused on surfaces of the core particles, wherein the core particles on which the resin fine particles are fixed and fused are sphered and have an average degree of roundness of 0.960 or more, and
   wherein a ratio of use of the resin fine particles is set in the range from 100 to 300% in the rate of the total projection area of the resin fine particles relative to the total surface area of the core particles.

2. An image display apparatus, comprising two substrates at least one of which is transparent and display particles that are sealed between the substrates so that by generating an electric field between the substrates, the display particles are moved to display an image,
   wherein the display particles are those of claim 1.

3. The image display apparatus of claim 2, wherein the display particles comprise positively chargeable display particles and negatively chargeable display particles, and both of them are the display particles of claim 1.

4. The display particles of claim 1, wherein the resin fine particles have a glass transition point (Tg) of 70 to 95° C.

5. The display particles of claim 1, wherein the absolute value of a difference in a glass transition point between the resin fine particles and the binder resin is 20 to 40° C.

6. The display particles of claim 1, wherein the fixing process is carried out by means of a mixing device that exerts a comparatively weak shearing force with a comparatively small amount of heat generation.

7. The display particles of claim 1, wherein the fusing process is carried out by means of a mixing device that exerts a comparatively strong shearing force with a comparatively large amount of heat generation.

8. The display particles of claim 1, wherein the display particles are white display particles and the ratio of use of the resin fine particles is set in the range from 150 to 250%.

9. The display particles of claim 1, wherein the display particles are black display particles and the ratio of use of the resin fine particles is set in the range from 100 to 200%.

10. The display particles of claim 1, wherein the average degree of roundness is 0.960 to 0.980.

11. The display particles of claim 1, further comprising an external additive having an average primary particle size of 10 to 200 nm.

12. The display particles of claim 11, wherein the external additive is added at an amount of 1 to 20 parts by weight relative to 100 parts by weight of the display particles.

13. A production method of display particles for an image display apparatus, comprising;
   kneading and pulverizing at least a binder resin and a colorant to give core particles, fixing and fusing resin fine particles on surfaces of the core particles, and sphering the core particles on which the resin fine particles are fixed and fused to give an average degree of roundness of 0.960 or more, wherein a ratio of use of the resin fine particles is set in the range from 100 to 300% in the rate of the total projection area of the resin fine particles relative to the total surface area of the core particles, and wherein the image display apparatus comprises two substrates at least one of which is transparent, with the display particles being sealed between the substrates in a powder state, so that by generating an electric field between the substrates, the display particles are moved to display an image.

* * * * *